United States Patent
Valembois et al.

(10) Patent No.: US 9,752,694 B2
(45) Date of Patent: Sep. 5, 2017

(54) SINGLE-USE VALVE (71) Applicants: CONSEIL ET TECHNIQUE, Lauzerville (FR); CENTRE NATIONAL D'ETUDES SPATIALES CNES, Toulouse (FR)

(72) Inventors: Guy Valembois, Lauzerville (FR); Denis Dilhan, Auterive (FR); Bernard Salvetat, Toulouse (FR)

(73) Assignees: CONSEIL ET TECHNIQUE, Lauzerville (FR); CENTRE NATIONAL D'ETUDES SPATIALES CNS, Toulouse (FR)

( * ) Notice: Subject to any disclaimer, the term of this patent is extended or adjusted under 35 U.S.C. 154(b) by 28 days.

(21) Appl. No.: 14/435,397

(22) PCT Filed: Oct. 16, 2013

(86) PCT No.: PCT/FR2013/052467
§ 371 (c)(1),
(2) Date: Apr. 13, 2015

(87) PCT Pub. No.: WO2014/064369
PCT Pub. Date: May 1, 2014

(65) Prior Publication Data
US 2015/0276077 A1  Oct. 1, 2015

(30) Foreign Application Priority Data
Oct. 23, 2012 (FR) ..................... 12 60076

(51) Int. Cl.
*F16K 17/40* (2006.01)
*F16K 31/56* (2006.01)

(52) U.S. Cl.
CPC .............. *F16K 17/40* (2013.01); *F16K 13/04* (2013.01); *F16K 31/56* (2013.01); *Y10T 137/1812* (2015.04)

(58) Field of Classification Search
CPC ......... Y10T 137/1834; Y10T 137/1819; Y10T 137/1812; F16K 31/56; F16K 13/04; F16K 17/40
(Continued)

(56) References Cited

U.S. PATENT DOCUMENTS 2,120,248 A * 6/1938 Hinchman .............. F16K 13/04
                                                          141/329
2,721,571 A * 10/1955 Gershon .................. F16K 13/06
                                                          137/75

(Continued)

FOREIGN PATENT DOCUMENTS

GB         2424692 A       10/2006

*Primary Examiner* — Craig Schneider
*Assistant Examiner* — P. Macade Nichols
(74) *Attorney, Agent, or Firm* — Andrew W. Chu; Craft Chu PLLC (57) ABSTRACT

The single-use valve to be installed on a line for transporting a fluid includes a tubular body, which is intended to be placed on the line and contains a mobile element that is able to take up two positions in the tubular body. Each position allows the fluid to pass through the tubular body or not, one being a standby position, while the other is an active position. Inside the tubular body, a driver able to move the mobile element such that the mobile element passes from its standby position to the active position. The driver includes a pretensioned elastic device. Outside the tubular body, a device for maintaining the pretension connects to a controller able to deactivate the device for maintaining the tension.

10 Claims, 4 Drawing Sheets

(58) Field of Classification Search
USPC .......... 137/68.29, 522, 523; 251/75, 66; 222/80, 83
See application file for complete search history.

(56) References Cited

U.S. PATENT DOCUMENTS

| | | | | |
|---|---|---|---|---|
| 3,887,108 A | * | 6/1975 | McDaniel | B67B 7/26 137/68.3 |
| 6,260,570 B1 | | 7/2001 | Wass et al. | |
| 6,302,171 B1 | | 10/2001 | Watts | |

* cited by examiner

SINGLE-USE VALVE

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to a single-use valve device.

Already known are single-use valves, for example of the decompression valve type, the operation of which requires using pyrotechnic means in which moving parts for opening or closing the valve are generally retained by fuse elements. These existing valves have drawbacks, namely in that their tightness cannot be guaranteed, and in that the use of pyrotechnic means should therefore be prohibited in some fields, depending on the nature of the fluid to cause to circulate.

The present invention relates more particularly, but non-restrictively, to the field of valves used in the spatial industry, whether they are normally closed or normally open valves, which must meet determined specifications.

Thus, optimally, besides the fact that the opening and closing must occur in a secure way, such a valve must meet the following technical objectives:
  absence of sealing system with a gasket (presence of a continuous metallic barrier between the fluid and the exterior of the valve, whether it is closed or open after operation),
  absence of external pollution due to the operation of the valve,
  absence of internal pollution due to the operation of the valve,
  limitation of the impacts induced by the operation of the valve,
  compatibility of all materials with the fluids to be controlled.

2. Description of Related Art Including Information Disclosed Under 37 CFR 1.97 and 37 CFR 1.98.

The single-use valves known to date have some of these features, but not all.

Thus known are, for example, the single-use valves described in U.S. Pat. Nos. 6,302,171, 6,260,570 and GB 2 424 692, which each comprise a firing pin capable, through its displacement, of piercing a membrane or a cap under the action of a driving means controlled by a trigger. However, none of these valves is perfectly tight and cannot meet the aforementioned specifications.

SUMMARY OF THE INVENTION

The present invention is aimed at coping with this drawback by providing a single-use valve device permitting to meet all the aforementioned requirements.

The single-use valve according to the invention is intended at being installed on a fluid-transportation line, and it is essentially characterized in that it comprises:
  a tubular body intended to be placed, in a perfectly tight way, on said line on the path of said fluid, as well as a movable member arranged in said tubular body and likely to adopt two positions in same, thus permitting, depending on the position of said movable member, that said fluid may or may not pass through said tubular body, one being a stand-by position, while the other one is an active position;
  inside said tubular body, a driving means designed capable of propelling said movable member in order to cause it to move from its stand-by position to the active position, and which consists of a pre-stressed springy means; and
  externally to said tubular body, on the one hand, a means for maintaining the pre-tension and, on the other hand, a control means capable of permitting to de-activate said means for maintaining the pre-tension.

Holding the movable member from the outside permits the tightness to be perfect.

According to an additional feature of the single-use valve according to the invention, the means for maintaining the pre-tension is designed capable of retaining the movable member, which is designed capable of ensuring the maintaining of the pre-tension.

According to another additional feature of the single-use valve according to the invention, the tubular body includes a section designed reversibly deformable in the transverse direction, so as to be capable of adopting at least two shapes, one of which, the first one, permits the passing-through of the movable member, while the other, the second one, does not permit this passing-through, and that the holding means are designed capable of permitting the deformation of said section, so as to cause it to pass from the first shape into the second one.

According to another additional feature of the embodiment of the single-use valve according to the invention, the holding means consists of a means for wedging the movable member, capable of clamping the latter through the deformable section.

According to another additional feature of the single-use valve according to the invention, the wedging means includes two jaws shaped so as to be capable of being held clamped by winding of at least one link, and of moving away when said link is released, the latter being connected to the control means, which is designed capable of breaking said link or what connects it to said control means.

According to a variant of the single-use valve according to the invention, the two jaws are independent and are held clamped by two links, to this end they each include, at each of their ends, an extension capable of being held with the extension in front of the other jaw, through the winding of a link.

According to another additional feature of the single-use valve according to the invention, the link consists of a helical spring wound on a pulley formed by bringing two elements close to each other, each integral with a jaw of the wedging means.

According to another additional feature of the preferred embodiment of the single-use valve according to the invention, the control means consists of a pyrotechnic trigger.

The single-use valve according to the invention may be a normally closed valve or a normally open valve, in either case, the features of the tubular body and the movable member are different.

Thus, the single-use valve according to the invention in a normally closed version, and according to a particular embodiment, is essentially characterized in that the tubular body is closed by a tear-off cap, while the movable member consists of a perforating means designed capable of being movable under the action of springy means, after releasing the pre-tension.

The single-use valve according to the invention, in a normally open version, and according to a particular embodiment, is essentially characterized in that the end of the movable member, opposite the one applied against the springy means, is configured by a flap capable, under the action of said springy means, after releasing the pre-tension, of entering into contact with a seat the tubular body includes internally, and of being held applied against same by said springy means.

The advantages and features of the single-use valve according to the invention will become clear from the following description, which refers to the attached drawing, which represents several non-restrictive embodiments of same.

DETAILED DESCRIPTION OF THE DRAWINGS

Figure 1A:
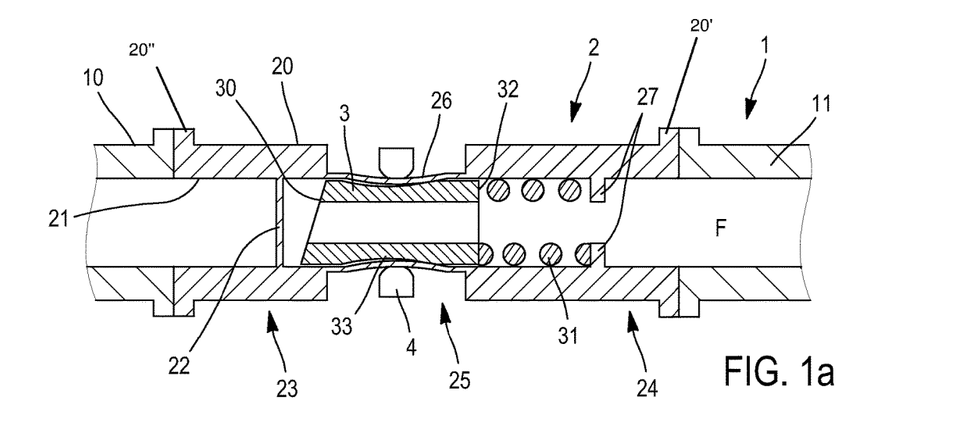
FIGS. 1a and 1b represent schematic longitudinal cross-sectional views of a single-use valve according to the invention, in a normally closed version, in closed and open position, respectively.
Figure 1B:
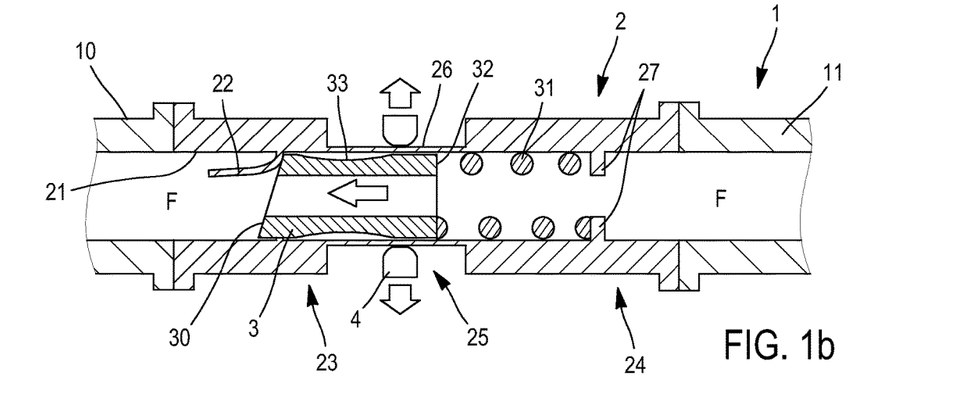

Referring to FIGS. 1a and b, we can see a line 1, on which is arranged a normally closed single-use valve 2 according to the invention, intercalated between two conduit lengths 10 and 11.

The valve 2 comprises a tubular body 20, at which are butt ended the two ends of conduits 10 and 11 at outlet end 20" and inlet end 20', respectively, and the internal channel 21 of which is closed by a cap 22, so as to prevent the circulation of the fluid F in the line 1, in this case of the end of the conduit 11, towards the end of the conduit 10.

The tubular body 20 is divided into three sections, two end sections 23 and 24, and an intermediate section 25, the cap 22 being integrated into the end section 23.

The two end sections 23 and 24 are preferably, but non-restrictively, made of one or more rigid materials, while the intermediate section 25 is designed deformable.

It should be noted that the intermediate section 25 can be in different forms, its deformability can be obtained by the material it is made of and/or by the small thickness of the tubular wall 26, which it is formed of.

In the channel 21 is placed a perforator means, namely a punch 3, which is in the general form of a tube, one end 30 of which, the one facing the cap 22, is shaped so as to permit the tearing of the latter, in this case wedge-shaped. The end segment 24 is internally provided with elements 27, which protrude into the channel 21, and which form a bearing means for a spring 31, against which abuts the punch 3 by its end 32, opposite the end 30.

Furthermore, the valve 2 also comprises a holding means, such as a gripper 4, arranged in front of the intermediate section 25 and designed so as to be capable of pinching and deforming this intermediate section 25 in order to immobilize the punch 3, which has to this end, in its middle region, a concave peripheral deformation 33. Prior to the punch 3 being held by the gripper 4, the spring 31 will have been compressed, and the punch 3 attached to the latter.

Thus the spring 31 is pre-stressed through the punch 3, which is in turn held by the gripper 4.

Figure 2A:
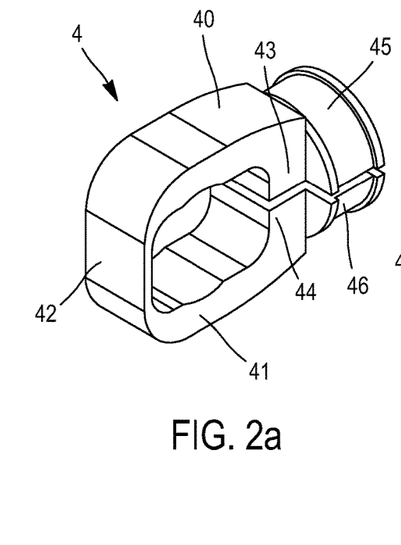
FIGS. 2a and 2b represent views respectively in perspective and in elevation of a portion of the same valve.
Figure 2B:
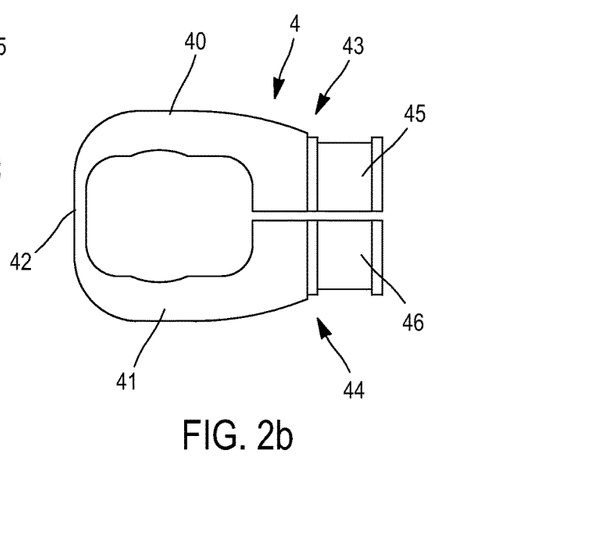

When referring to FIG. 2b, we can see that the untightening of the gripper 4 causes the release of the punch 3, which, under the action of the spring 31 and the deformation of the wall 26, moves towards the cap 22 it tears, thus letting the fluid F pass.

The opening of the gripper 4 can be obtained in different ways through very diverse release systems. When referring to FIGS. 3a and 3b, we can see a particular embodiment of the gripper 4, adapted to a release system of a simple design.

In these figures, we can see that the gripper 4 has the shape of an open ring, forming a C, and including two diametrically opposite portions 40 and 41, forming jaws, connected by a middle region 42 having a certain flexibility, while the two free ends 43 and 44, respectively, diametrically opposite the middle zone 42, and held apart from each other in resting position, are each extended, radially with respect to said ring, by an extension 45 and 46, respectively, configured in the form of a half-pulley.

Bringing the two free ends 43 and 44 close to each other lead to the tightening of the jaws 40 and 46, and to the closing of the gripper 4, as well as to the creation of a pulley resulting from the association of two half-pulleys 45 and 46, about which a link, not shown, can be wound for immobilizing the gripper 4 in closed position. As will be seen below, this link may advantageously consist of a helical spring.

It should be noted that, according to a variant, the middle region 42 of the gripper 4 can be replaced by extensions similar to the extensions 45 and 46, also intended to be held by the winding of a link.

Figure 3:
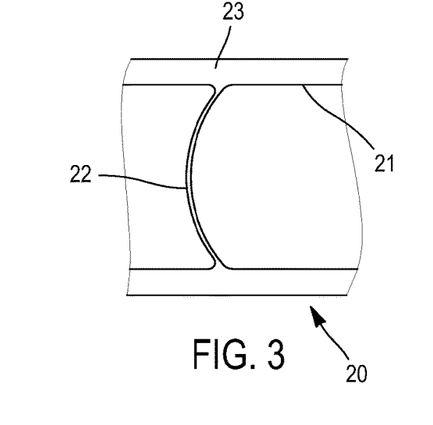
FIG. 3 represents a schematic cross-sectional view of one embodiment of another portion of the valve according to the invention.
Figure 4A:
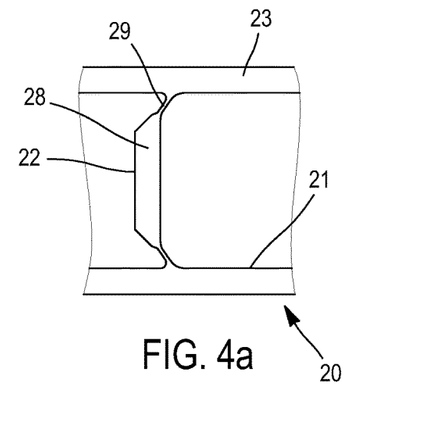
FIG. 4a represents a schematic cross-sectional view of another embodiment of the same portion of the valve according to the invention.

When referring now to FIGS. 3 and 4a, we can see two particular, but non-restrictive, embodiments of the cap 22.

The cap 22 may in a conventional manner have a spherical shape as shown in FIG. 3, but it can also and preferably have a conical shape as shown in FIG. 4a. Experiments have permitted to observe that the conical shape had many advantages, not only from the point of view of pressure resistance, but also as regards its manufacture as well as the ease of the uncapping operation.

This conical cap 22 comprises a central disk 28, peripherally bordered by a frustoconical crown 29 of smaller thickness, through which the cap 22 is connected to the tubular wall of the section 23, and which is intended to be cut during the uncapping operation. The central disc 28 ensures a determined rigidity for the cap 22, so that under the action of the pressure exerted onto the concave side of the cap 22, the crown 29 is only subjected to tensile stress.

This shape permits to access to sufficient pressure levels because the maximum stress in the cap is of a level similar to that in the tubular body 2.

Figure 4B:
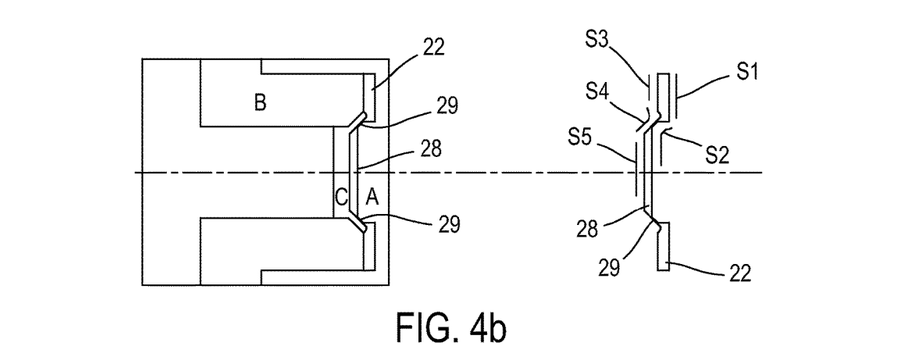
FIG. 4b shows a schematic view of the method for its manufacture.

From the point of view of manufacture, as can be seen in FIG. 4b, the conical cap 22 can be made in three steps of turning without re-machining, without the cutting forces stressing the frustoconical crown 29. Thus, during a phase A, the adjustment to the outer diameter, the finish-grinding of the surface S1, and the internal shape of the cap S2 are performed, during a phase B, the surface S3 is finish-grinded, during a phase C the outer surface S4 and the cutting of the surface S5 are carried out.

The so machined cap 22, without removing the blank, can be removed with high control of the desired accuracy. Its overall disk shape then promotes its welding to the tubular body 20, by being namely inserted between the sections 23 and 25.

Figure 5:
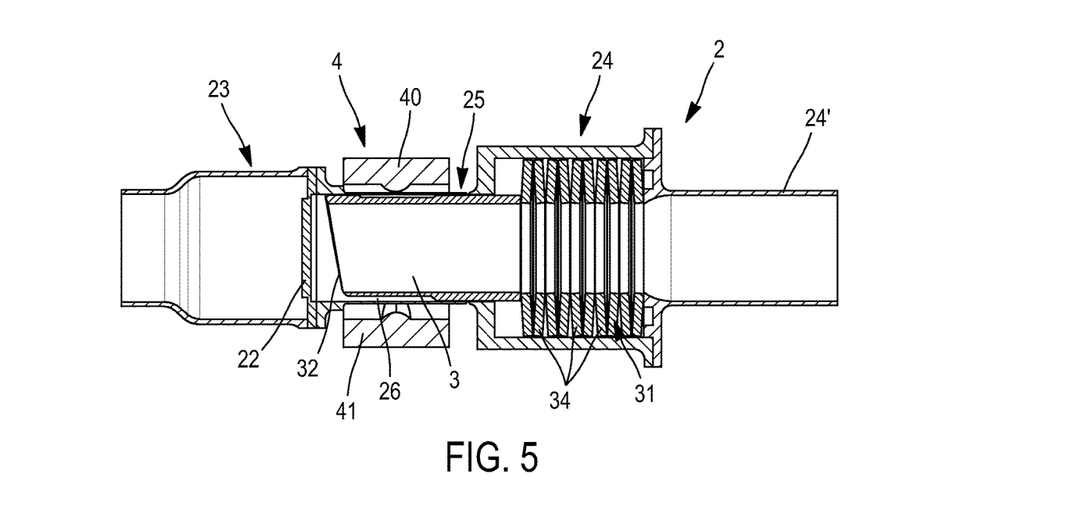
FIG. 5 represents a partial longitudinal cross-sectional view of the same valve.

When referring now to FIG. 5, we can see a valve 2 according to the invention, which consists of the assembly by welding of various elements.

Thus, the sections 24 and 25 consist of one single part, which is in turn welded to the section 23 after interposition of the cap 22, and while the spring 31 is pretensioned and the punch 3 is held by the gripper 4.

It should be noted that in this version the spring 31 consists of a stack of Belleville washers 34 and that the bearing means permitting to retain these Belleville washers 34 are in the form of an upstream tube 24', of a smaller diameter.

It should also be noted that the section 23 is widened compared to the section 25, so as to create a backlash capable of accommodating the cap 22 after uncapping, while the punch 3 is sufficiently inserted into the opening being created, without any possibility of return due to the spring 31, in order to prevent repositioning of the cap 22.

The thus produced valve 2 meets all the requirements in terms of tightness, namely in that this tightness is performed without using a seal.

Figure 6A:
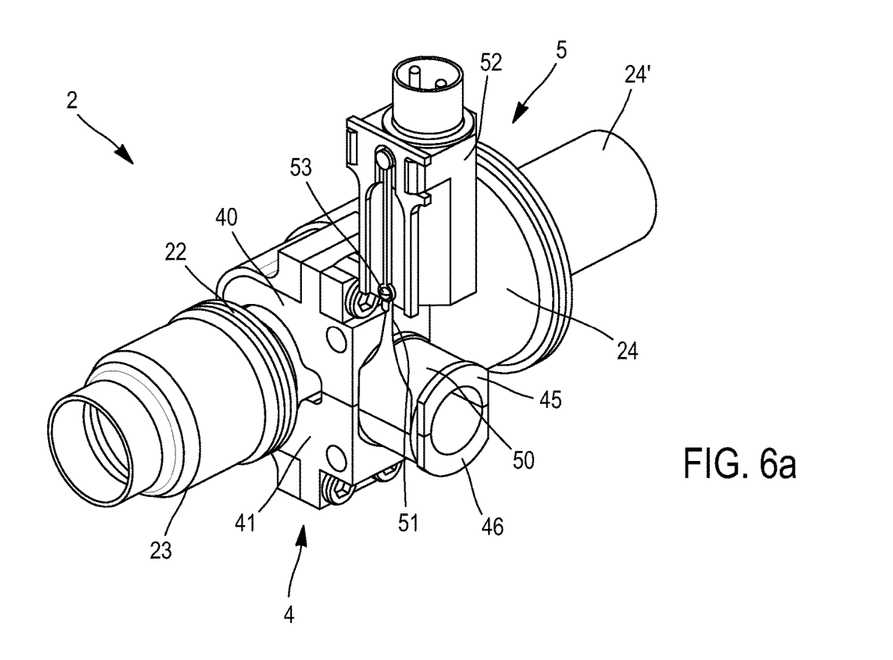
FIGS. 6a and 6b represent perspective views of the valve in closed and open position, respectively.
Figure 6B:
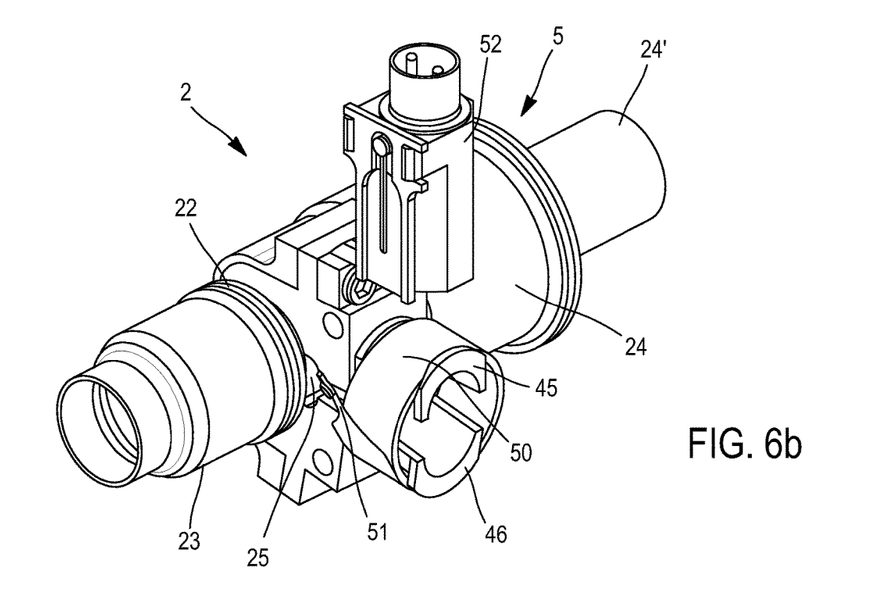

When referring now to FIGS. 6a and 6b, we can see a valve 2 in its entirety, and namely its control system 5 permitting to trigger the opening of the valve 2.

As can be seen in FIG. 6a, the valve 2 is in closed position, the gripper 4 is closed and holds the punch 3, the half-pulleys 45 and 46 being held attached by means of a helical spring 50 wound around them, and the free end 51 of which is fixed to an electrical connector 52 through a fuse wire 53.

In FIG. 6b, we can observe that after melting of the fuse wire 53, the free end 51 of the helical spring 50 has been released, which has released the helical spring 50 and caused, without any impact, the opening of the gripper 4 and, hence, of the valve 2.

The fitting of the valve 2 according to the invention as shown can be performed as follows:

assembling by peripheral welding of the upstream tube 24' and the section 24 after insertion of the Belleville washers 34, then placing of the punch 3, temporary mounting of the gripper 4, in order to permit the carrying out of operating tests without the presence of the cap 22, whereby an oversized dummy cap may ensure an operating safety comprising a motorization margin.

Remark: at the end of this step it will be possible to replace the punch 3, which has served for the tests, by a new punch 3.

placing of a holding tool, on the side of the upstream tube 24', for pre-tensioning the Belleville washers 34, then removing the gripper 4, assembly by peripheral welding the cap 22 on the section 25, then the section 23, carrying out tightness tests, placing of the gripper 4, and removal of the holding tool.

The obtained normally closed single-use valve 2 according to the invention can meet all mentioned specifications.

Figure 7:
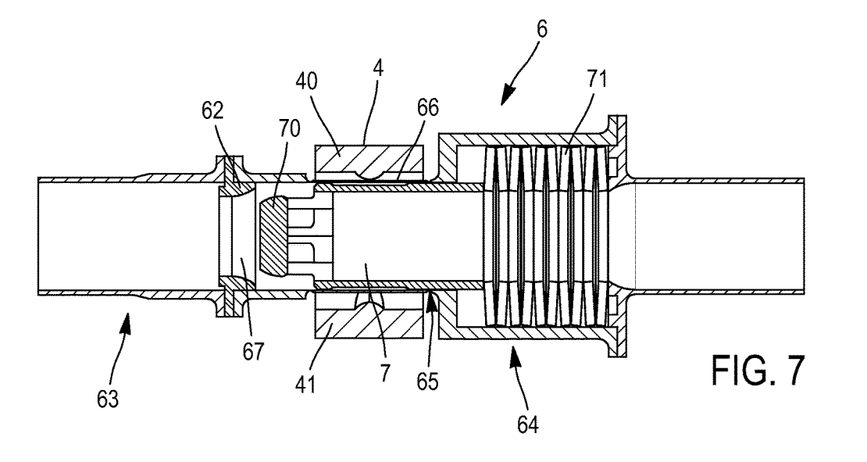
FIG. 7 represents a longitudinal cross-sectional view of a single-use valve according to the invention, in a normally open version.
Figure 8A:
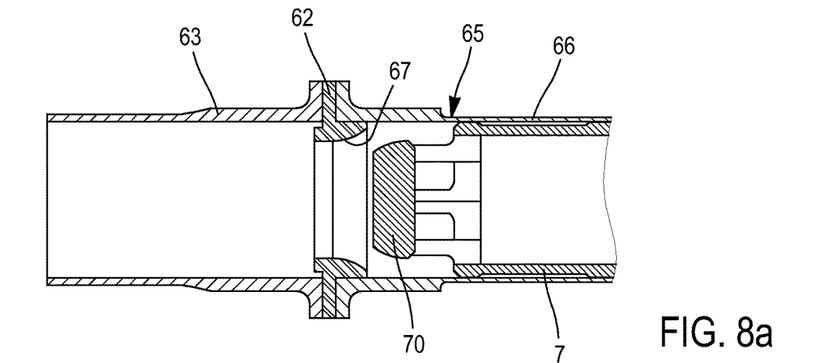
FIGS. 8a and 8b represent schematic partial views in longitudinal cross-section of the same valve in a normally open position, being open and closed, respectively.
Figure 8B:
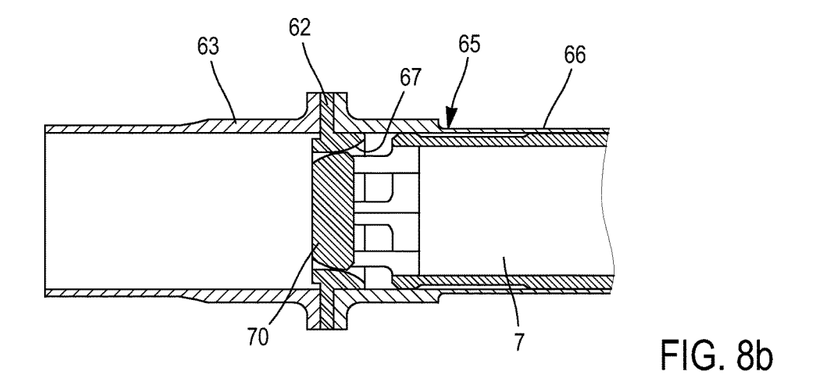

When referring now to FIGS. 7, 8a and 8b, we can see a single-use valve 6 according to the invention, in a normally open version.

This valve 6 has the main features of the normally closed valve 2, it is also in the form of a tubular body 60 comprising a channel 61, and it differs from the latter in that the cap and the punch are replaced by a valve system comprising a seat 62 and a flap 7.

Thus, the tubular body 60 comprises three sections, two end sections 63 and 64, and an intermediate section 65 the wall 66 of which is designed deformable and capable of cooperating with an external gripper 4 associated with a control system 5, not shown, so as to retain the flap 7, which stresses a spring 71 accommodated in the section 64.

The seat 62 consists of a narrowing of the inner diameter of the tubular body 60, it is in this embodiment in the form of a part intercalated between the sections 63 and 65, and providing an opening 67 of a generally conical shape flared on the side of the section 65.

The flap 7 is in the form of a tube the end of which facing the seat 62 is provided with a head 70 forming a disc-shaped obturator with a conical edge narrowing on the side of the seat 62, and the dimensions of which are adapted so as to permit it, as it moves under the action of the spring 71, to insert and be locked in the opening 67 of the seat 62, and thus to close the passageway, as shown in FIG. 8b.

The operation of the normally open valve 6 is identical to that of the normally closed valve 2, i.e. the release of the gripper 4 releases the flap 7, which, pushed by the spring 71, closes the opening 67.

It should be noted in addition that the spring 71 is configured so as to continue, upon release of the flap 7, to exert a pressure onto the flap 7 in order to maintain the passage closed.

What is claimed:

1. A single-use valve to be installed on a line for transporting fluid, the valve comprising:

a tubular body having an inlet end and an outlet end and being aligned with the line so as to flow fluid from said inlet end to said outlet end, said tubular body having a fluid tight seal between said inlet end and said outlet end;

a movable member arranged within said tubular body, said movable member having a first position and a second position relative to said tubular body, said first position corresponding to said tubular body being in a standby configuration, said standby configuration corresponding to stopped fluid flow through said tubular body and at least one side of the line, said second position corresponding to said tubular body being in an active configuration, said active configuration corresponding to activated fluid flow through said tubular body and both sides of the line;

a driving means arranged within said tubular body, said movable member being moveable from said first position to said second position according to said driving means, said driving means being comprised of a prestressed spring;

means for maintaining pre-tension positioned external to said tubular body and removably engaged to said movable member through said tubular body in said first position; and control means connected to said means for maintaining pre-tension, said means for maintaining pre-tension engaging said movable member according to said control means.

2. The single-use valve, according to claim 1, said means for maintaining pre-tension mechanically engages said movable member in said first position.

3. A single-use valve to be installed on a line for transporting fluid, the valve comprising:

a tubular body having an inlet end and an outlet end and being aligned with the line so as to flow fluid from said inlet end to said outlet end, said tubular body having a fluid tight seal between said inlet end and said outlet end;

a movable member arranged within said tubular body, said movable member having a first position and a second position relative to said tubular body, said first position corresponding to said tubular body being in a standby configuration, said standby configuration corresponding to stopped fluid flow through said tubular body and at least one side of the line, said second position corresponding to said tubular body being in an active configuration, said active configuration corresponding to activated fluid flow through said tubular body and both sides of the line;

a driving means arranged within said tubular body, said movable member being moveable from said first position to said second position according to said driving means, said driving means being comprised of a pre-stressed spring;

means for maintaining pre-tension positioned external to said tubular body and removably engaged to said movable member in said first position; and control means connected to said means for maintaining pre-tension, said means for maintaining pre-tension engaging said movable member according to said control means, wherein said tubular body is comprised of a deformable section, said deformable section having a first shape corresponding to said movable member in said second position and a second shape corresponding to said movable member in said first position, said deformable section being actuated between said first shape and said second shape by said means for maintaining pre-tension, said deformable section being actuated in a transverse direction between said first shape and said second shape.

4. The single-use valve, according to claim 3, wherein said deformable section is comprised of a wall, said means for maintaining pre-tension clamping said wall so as to set said second shape of said deformable section, said movable member being friction fit against said wall in said first position.

5. The single-use valve, according to claim 4,
wherein said means for maintaining pre-tension is comprised of two jaws and a link in connection to each jaw,
wherein actuating said link corresponds to clamping said wall,
wherein said link is connected to said control means, said control means setting said movable member in said first position when actuating said link to clamp said wall.

6. The single-use valve, according to claim 5, further comprising another link, wherein each jaw corresponds to a respective link, and wherein each link connects independently to said control means.

7. The single-use valve, according to claim 5, wherein said link comprises: a helical spring, and a pulley comprised of two elements, said helical spring being wound around said two elements, each element being made integral with a respective jaw, wherein said helical spring sets first positions of said two elements, said first positions of said two elements correspond to clamping said walls with said jaws so as to set said second shape of said deformable section and said movable member in said first position, and wherein said helical spring sets second positions of said two elements, said second positions of said two elements correspond to releasing said walls with said jaws so as to set first shape of said deformable section and said movable member in said second position.

8. The single-use valve, corresponding to claim 7, wherein said control means is comprised of a pyrotechnic trigger, said pyrotechnic trigger actuating said two elements between said first positions and said second positions.

9. The single-use valve, corresponding to claim 3,
wherein said tubular body comprises a tear-off cap at said outlet end;
wherein said movable member is comprised of an end, and opposite end, and a perforating means at said end, and
wherein said perforating means pierces said tear-off cap in said second position so as to release said activated fluid flow through tubular body and both sides of the line.

10. A single-use valve to be installed on a line for transporting fluid, the valve comprising:

a tubular body having an inlet end and an outlet end and being aligned with the line so as to flow fluid from said inlet end to said outlet end, said tubular body having a fluid tight seal between said inlet end and said outlet end;

a movable member arranged within said tubular body, said movable member having a first position and a second position relative to said tubular body, said first position corresponding to said tubular body being in a standby configuration, said standby configuration corresponding to activated fluid flow through said tubular body and both sides of the line, said second position corresponding to said tubular body being in an active configuration, said active configuration corresponding to stopped fluid flow through said tubular body and at least one side of the line;

a driving means arranged within said tubular body, said movable member being moveable from said first position to said second position according to said driving means, said driving means being comprised of a pre-stressed spring;

means for maintaining pre-tension positioned external to said tubular body and removably engaged to said movable member in said first position; and control means connected to said means for maintaining pre-tension, said means for maintaining pre-tension engaging said movable member according to said control means, wherein said tubular body comprises a seat at said outlet end;

wherein said movable member is comprised of an end, and opposite end, a spring means at said opposite end, and a flap at said end, and wherein said flap sealing engages said seat in said second position so as to stop said activated fluid flow through tubular body and both sides of the line.

\* \* \* \* \*